Oct. 8, 1946.  C. RANEY  2,408,952
GRAIN HANDLING MACHINE
Filed March 2, 1944   3 Sheets-Sheet 1
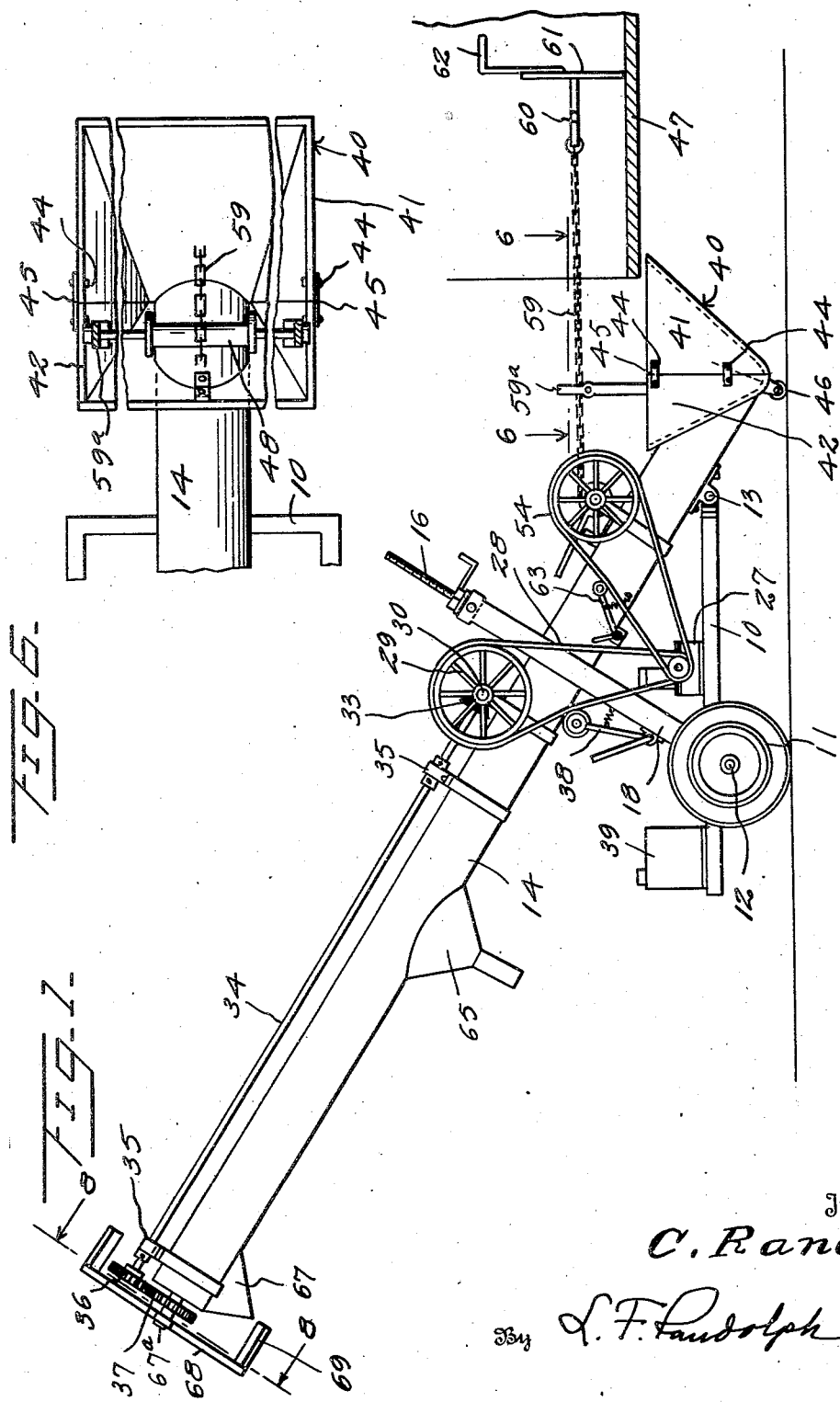
Inventor
C. Raney
By L. F. Randolph
Attorney

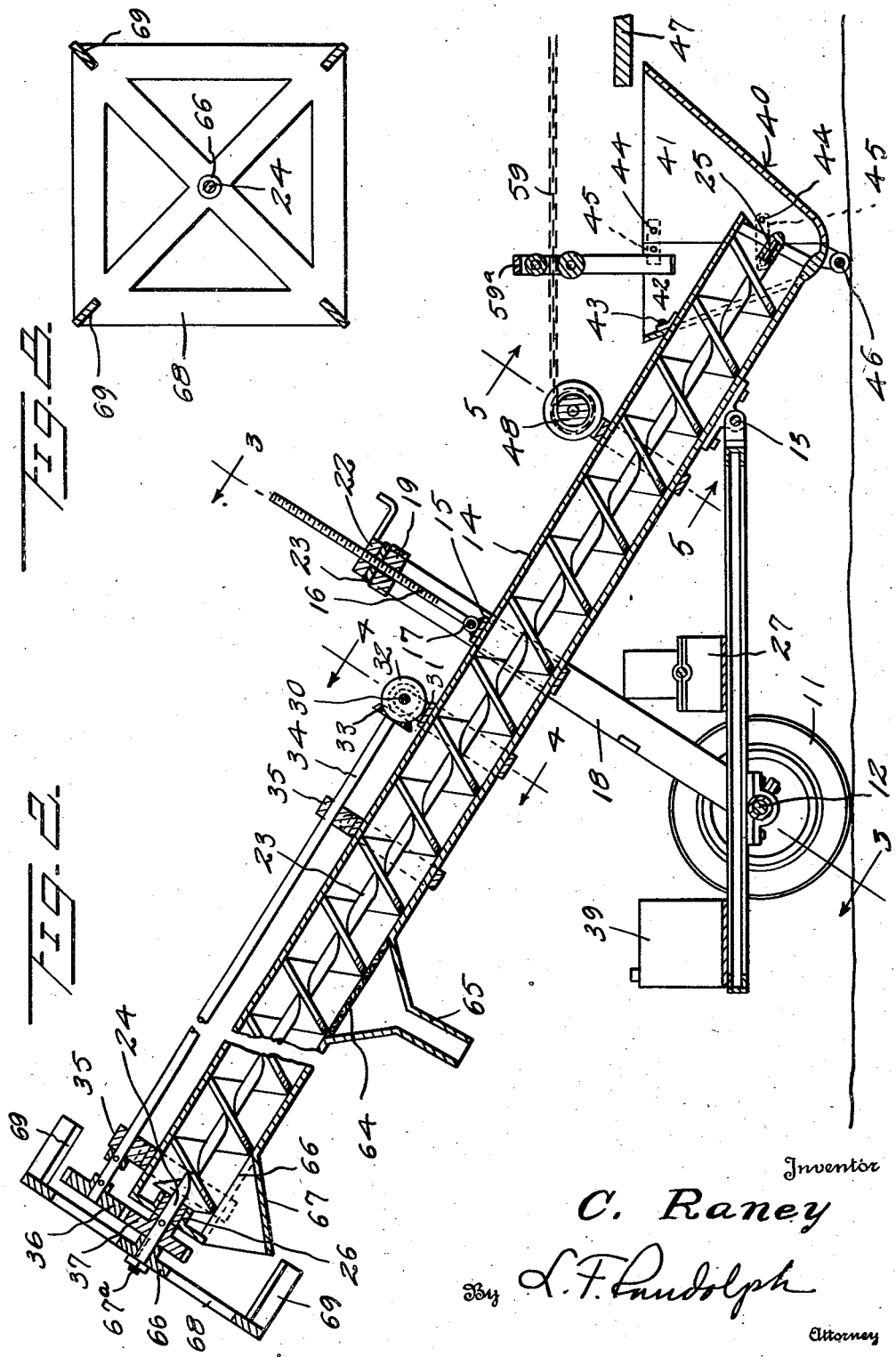

Oct. 8, 1946.                    C. RANEY                    2,408,952
                          GRAIN HANDLING MACHINE
                         Filed March 2, 1944           3 Sheets-Sheet 3
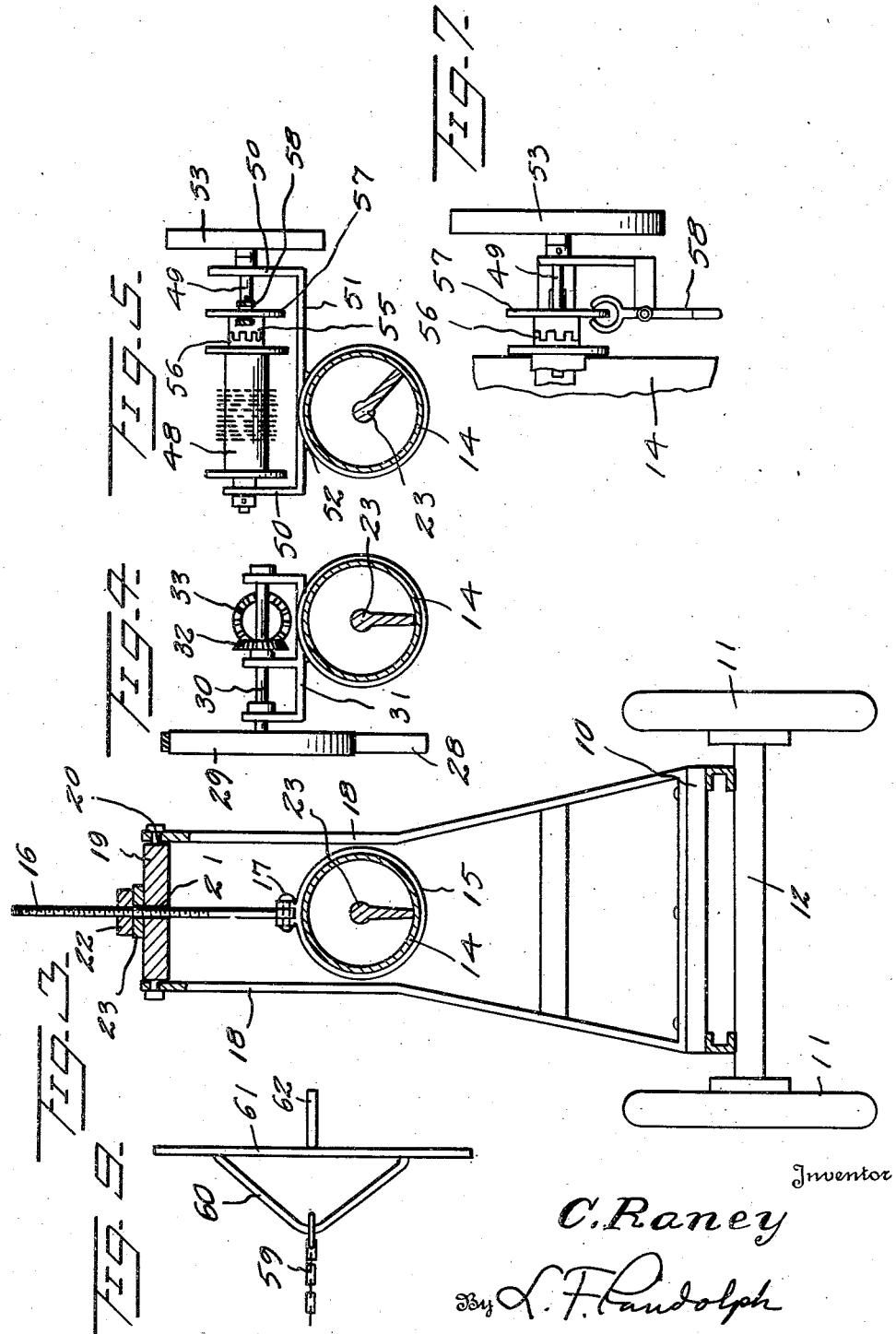
Inventor
C. Raney
By L. F. Randolph
Attorney Patented Oct. 8, 1946

2,408,952

UNITED STATES PATENT OFFICE 2,408,952

GRAIN HANDLING MACHINE

Charlie Raney, Brownfield, Tex.

Application March 2, 1944, Serial No. 524,717

1 Claim. (Cl. 198—233)

This invention relates to a grain handling or loading machine, particularly useful in loading trucks from piles of grain on the ground, in loading the grain onto railroad cars and in unloading grain from railroad cars, or equivalent operations not only with grain but with similar materials.

It is particularly aimed to provide a novel structure having an elongated conveyor body mounted on a trailer or wheel frame, capable of being tilted or adjusted to the correct angle of operation, having a removable receiving hopper portion at one end and having a removable distributor fan at the other end, both selectively usable according to the work in hand.

I also provide for positively operating the conveyor and associated parts by a prime mover on the trailer or wheel train.

The more specific objects and advantages will become apparent from a consideration of the description following taken in connection with accompanying drawings illustrating an operative embodiment.

In said drawings:

Figure 1 is a side elevation of the loader, shown in connection with a fragment of a truck in the act of unloading the latter;

Figure 2 is a substantially central longitudinal vertical sectional view through the loader;

Figure 3 is a vertical sectional view taken on the line 3—3 of Figure 2;

Figure 4 is a vertical sectional view taken on the line 4—4 of Figure 2;

Figure 5 is a vertical sectional view taken on the line 5—5 of Figure 2;

Figure 6 is a fragmentary plan view looking toward the plane of line 6—6 of Figure 1;

Figure 7 is a detail plan view showing the controlling clutch for the winch for the unloading drag;

Figure 8 is a detail section taken on the line 8—8 of Figure 1; and

Figure 9 is a detail plan view of the unloading drag.

Referring specifically to the drawings wherein like reference characters designate like or similar parts throughout the different views, I provide a wheel frame or trailer as at 10 which may be moved or drawn from place to place by a tractor or other power. This frame has preferably a single pair of wheels 11 mounted by an axle 12 thereon, permitting tilting of the frame and consequent tilting and adjustment of the parts carried thereby.

At the rear end, frame 10 is pivotally connected at 13 to a conveyor tube or chute 14 disposed at an angle to such frame 10 and relatively adjustable with respect thereto on the pivotal axis 13. A collar 15 loosely surrounds the chute 14 and a screw rod 16 is pivotally connected at 17 to such collar. An auxiliary frame of U-shape, has upwardly and rearwardly inclined side bars 18 between and to which a bridge member 19 is pivotally connected at 20 at the top. Rod 16 extends upwardly through an enlarged opening 21 in the bridge 19 and is screw threaded, and above the bridge is engaged by a nut 22, a washer 23 preferably being interposed between the nut and bridge. Through the turning of the nut 22, it will be realized that the chute may be adjusted to different angles, since the frame 10 and chute will move relatively on the pivotal axis 13.

Rotatably disposed within the chute 14 is a worm or screw conveyor or the equivalent 23 having a shaft 24 journaled at opposite ends in bearings 25 and 26 mounted by the chute 14.

The conveyor 23 is positively rotated and to this end a prime mover 27, such as an internal combustion engine, is mounted on the frame 10. Such prime mover 27 through the medium of a belt 28 drives a pulley 29 keyed to a cross shaft 30 journaled in suitable bearing means 31 fastened exteriorly of the chute 14. Cross shaft 30 has a gear wheel 32 keyed thereto which is enmeshed with a bevel gear wheel 33 keyed to a shaft 34 extending parallel to the chute and journaled in bearings 35 fastened to the latter. Shaft 34 and shaft 24 have intermeshing gear wheels 36 and 37 at the upper ends of such shafts so that as a result, through the operation of the motor 27, the worm or conveyor 23 will be positively operated. A conventional tightener for the belt 28 is shown at 38, being mounted on the auxiliary frame at one of its bars 18. A tank for fuel for the motor 27 is preferably provided at 39 on frame 10, the opposite side of axle 12, to the motor 27.

At the lower end, chute 14 extends into a receiving hopper 40 having a forward section 41 and a rear section 42, the latter being rigidly mounted as at 43 on the chute and the former section 41 being detachably connected to the section 42 by means of bolts 44 engaging cleats 45 on the latter. Section 42 preferably has one or more rollers 46 mounted on the bottom to rest on and travel on the ground.

With the hopper in place as in Figure 2, material may be received thereby, but in instances where the chute 14 is discharging, the section 41 is removed from the section 42.

To aid in removing grain or other material from a truck or the like as at 47, I provide a winch or winding drum 48. This drum is loose on a cross shaft 49 journaled in upstanding ends 50 of a U-shaped bracket 51 mounted or otherwise secured at 52 to the chute 14. Shaft 49 has a pulley 53 thereon, traversed by a belt 54 driven by the aforesaid motor 27. Slidable on and rotatable with the shaft 49 is a clutch member 55 which is engageable with and disengageable from a clutch member 56 forming part of the drum 48. Clutch member 55 has a disc 57 which is engageable by a conventional lifting lever at 58. A cable or chain 59 has one end fastened to the drum or winch 48 and the other end is fastened to a loop 60 of a drag blade or scraper 61 also provided with a handle at 62. It will be understood that through the operation of the winch or drum, under control of its clutch, the chain 59 will be drawn to aid in discharging grain or other material into the hopper 40 so that the worm or conveyor 23 will elevate it. A conventional tightening member for the belt 54 may be provided on the chute 14 at 63.

A screen or sieve 64 may be provided at a suitable location in the bottom of the chute 14 to enable sand or foreign matter to escape therethrough, and which is guided in its discharge through a tube 65 fastened to the chute.

At the upper end of the tube, in its bottom, it has a discharge opening 66 and a guide lip 67 leading therefrom. In addition, at the upper end of the shaft 24, I detachably secure as by means of a key 66 and nut 67a, a fanlike distributor member 68, the same preferably having blades 69 at its corners turned toward the chute 14.

In operation, with the parts disposed as in Figure 2, grain or other material may be unloaded from a truck or the like 47 into the hopper 40 and thence elevated through the chute 14 by the conveyor 23, into a railroad car or the like, such material discharging from the chute 14 through the opening 66, and as it discharges from the lip 67, being distributed in the car through the action of the rotatable distributor 68. In loading a truck, car or the like from a pile of material on the ground, the lip 67 is arranged to discharge into the truck, car or the like, but the distributor 68 is removed. Such grain or material may be shoveled or placed in the hopper 40 or the section 41 may be removed and the forward end of the chute 14 arranged directly into the pile to engage and elevate the material.

It will be clear that in unloading, as from a truck 47, the action is greatly facilitated since one operator may control the clutch 55—56, while another operator will position and manipulate the drag 61.

Various changes may be resorted to provided they fall within the spirit and scope of the invention.

I claim as my invention:

A structure of the class described comprising a chute, means to mount said chute at an angle, conveyor means within the chute, displacable hopper means at one end of the chute, means serving as a discharge at the other end of the chute, a distributor member adjacent the latter means for engagement with discharge material, means removably mounting the distributor means on the conveyor means, a mobile frame on which the chute is pivoted, and an auxiliary frame on said mobile frame through which the chute passes, and means suspending the chute from and adjustably mounted on the top of said auxiliary frame, said last mentioned means comprising a screw rod pivoted to the chute and nut means screw-threaded to the rod and bearing on the top of the auxiliary frame.

CHARLIE RANEY.